United States Patent
Bucci et al.

[11] Patent Number: 5,220,112
[45] Date of Patent: Jun. 15, 1993

[54] FIXATION OF HEAVY METALS IN MUNICIPAL SOLID WASTE INCINERATOR ASH

[75] Inventors: Donald P. Bucci, Mertztown; Francis A. Altemose, II, Long Pond; Nancy C. Easterbrook, Macungie; Edwin N. Givens, Bethlehem; Joseph Klosek, Wescosville, all of Pa.; Kenneth D. Tracy, Randolph, N.J.; Kai P. Wong, Allentown, Pa.

[73] Assignee: Air Products and Chemicals, Inc., Allentown, Pa.

[21] Appl. No.: 757,359

[22] Filed: Sep. 10, 1991

[51] Int. Cl.$^5$ .............. C04B 18/08; C04B 18/06; C04B 14/00; C04B 18/30
[52] U.S. Cl. ...................... 588/256; 588/231; 588/233; 588/251; 588/249; 106/710; 106/DIG. 1; 106/287.18
[58] Field of Search ............. 106/710, 707, DIG. 1, 106/287.18; 423/DIG. 20; 588/231, 233, 248, 251, 256

[56] References Cited

U.S. PATENT DOCUMENTS

| | | | |
|---|---|---|---|
| 3,837,872 | 9/1974 | Conner | 106/74 |
| 4,209,335 | 6/1980 | Katayama et al. | 106/645 |
| 4,299,611 | 11/1981 | Penberthy | 65/27 |
| 4,629,509 | 12/1986 | O'Hara et al. | 106/710 |
| 4,737,356 | 4/1988 | O'Hara et al. | 423/659 |
| 4,840,671 | 6/1989 | Lynn et al. | 106/707 |
| 4,877,453 | 10/1989 | Loggers et al. | 106/710 |
| 4,917,733 | 4/1990 | Hansen | 106/710 |
| 4,941,772 | 7/1990 | Roesky et al. | 106/707 |
| 4,971,627 | 11/1990 | Koslowski et al. | 106/DIG. 1 |

*Primary Examiner*—Mark L. Bell
*Assistant Examiner*—Michael Marcheschi
*Attorney, Agent, or Firm*—Robert J. Wolff; Thomas G. Ryder; James C. Simmons

[57] ABSTRACT

Fly ash generated from incineration of municipal solid waste (MSW) when placed in landfills can under mild acid conditions leach lead and cadmium. A process for stabilizing lead in this fly ash is presented which involves calcining a mixture of the fly ash and certain calcium-containing compounds in the presence of an oxygen containing gas stream at a temperature greater than about 475° C. and substantially less than about 800° C. for times from about 30 minutes up to about 5 hours. Such treated MSW fly ash will give leachates containing lead concentrations less than the EPA regulatory limit.

18 Claims, 2 Drawing Sheets

FIXATION OF HEAVY METALS IN MUNICIPAL SOLID WASTE INCINERATOR ASH

FIELD OF THE INVENTION

This invention relates to the treatment of heavy metals-containing ash, particularly fly ash, in order to prevent or to reduce substantially the amount of heavy metals, such as lead and cadmium, which may leach from the ash.

BACKGROUND OF INVENTION

Disposal of nonhazardous, municipal solid waste (MSW) is becoming a substantial problem across this country as well as the world, since landfill space is becoming more limited and regulations are forcing many landfill sites to close. At the same time costs for disposing of municipal trash are increasing. Incineration of municipal trash is a method which many areas and municipalities employ for dealing with this problem, at least partially, since incineration reduces the volume of the MSW by about 90% and the weight by about 70%, while at the same time eliminating any biologically active materials. Additionally, the energy produced in the incineration can be utilized for generating steam and electricity. This is a great savings in the volume of material to be placed in a landfill and in the weight of material to be transported to a landfill. However, the incineration of MSW tends to concentrate its metals content, particularly heavy metals such as lead and cadmium, in the residue or ash from the combustion. Thus, while incineration reduces the volume of material to be landfilled, at times it tends to produce a residue or ash which contains concentrations of heavy metals in a form, usually a halide, that can leach upon contact with groundwater. When this occurs, such materials become unsuitable for traditional municipal landfill sites and special landfills and/or secondary ash treatment procedures are required.

The ash from the incineration of MSW or the combustion of other carbon-, heavy metal-, and halogen-containing materials which remains behind in the combustion zone and usually falls to the bottom of the combustion zone (Bottom Ash) makes up over 85% of the residual solids generated by incineration or combustion. Generally, Bottom Ash tends to have lead and cadmium concentrations of less than about 2500 ppm and 15 ppm by weight, respectively. Usually, the metals in Bottom Ash are not in a soluble form, such as a chloride, and, therefore, Bottom Ash is typically innocuous and poses no environmental burden. In fact Bottom Ash can even be used beneficially, such as an aggregate.

On the other hand, however, the very small, solid, particulate matter which is usually carried out of the combustion zone by exiting gas, such as flue gas, makes up the remaining residual solids generated in MSW incinerators or other combustion zones. This entrained solid particulate matter is generally termed Fly Ash. It is enriched in lead and cadmium halides, particularly chlorides, and upon separation from the gas in which it is entrained can represent a disposal problem since, upon exposure to ground water (such as in a landfill) can leach substantial quantities of lead and cadmium. Typical Fly Ash from an MSW incinerator can have lead and cadmium concentrations of greater than about 3500 ppm and 200 ppm by weight, respectively. Thus, while incineration reduces the total volume and weight of material for disposal, it produces a material which can present a disposal problem.

Several methods have been suggested to stabilize these residual solids to prevent the leaching of heavy metals, such as lead and cadmium, into groundwater. U.S. Pat. No. 4,629,509 teaches the addition of calcium sulfide to the fly ash produced from incineration of MSW in order to form highly insoluble cadmium and lead sulfides, thereby immobilizing the lead and cadmium and preventing their leaching. This patent also suggests effecting heavy metal stabilization through addition of a mixture of lime and an aqueous solution of a soluble sulfide such as sodium sulfide.

It has also been suggested, in U.S. Pat. No. 4,737,356, that the addition of a water soluble phosphate to ash containing free lime immobilizes the lead to leaching in a pH range of from approximately 5 to 12. Soluble phosphate addition in the form of phosphoric acid in the proportion of from 1 to 8% by weight of the ash is taught to reduce the leachable lead to below the EPA regulatory limits over a broader pH range than without this treatment.

Another method suggested for stabilizing waste materials, ash and related residues is through addition of soluble silicates and silicating setting agents to the waste material in order to produce insoluble metal silicates. This technique is described, for example, in U.S. Pat. No. 3,837,872.

It has further been suggested (U.S. Pat. No. 4,299,611) that ash may be vitrified in a glass furnace at a temperature in the range of about 2500° F. The resulting glass material, which has a significantly reduced surface area, is said to resist extraction of the heavy metals when exposed to groundwater or to EPA tests designed to simulate groundwater extraction conditions.

BRIEF SUMMARY OF INVENTION

This invention is directed to a process for the stabilization of a heavy metals-containing fly ash obtained by subjecting flue gas to particulate separation, particularly flue gas from the combustion of a carbon-, heavy metal-, and halogen-containing material. A calcium-containing material is admixed with the fly ash to form a mixture wherein the calcium-containing material is present in the mixture so as to provide a weight ratio of calcium to fly ash from about 0.04 to about 0.5:1. This mixture is heated to a temperature from about 475° C. to less than about 800° C. and maintained at this temperature for at least about 30 minutes and less than about five hours while in contact with an oxygen-containing gas.

One particular embodiment of the present invention is to use the furnace of a MSW incineration plant as the source of heat required by the present invention and to use ambient air as the oxygen-containing gas required by the invention. FIG. 1 illustrates this embodiment.

A second embodiment of the present invention is to heat ambient air as the oxygen-containing gas to a temperature from about 475° C. to about 800° C. followed by contacting the mixture of fly ash and the calcium-containing material with the heated air for a period of time from about 30 minutes to about five hours wherein said contacting is performed while the mixture is contained within a fluidized bed. FIG. 2 illustrates this embodiment.

DETAILED DESCRIPTION OF INVENTION

Figure 1:
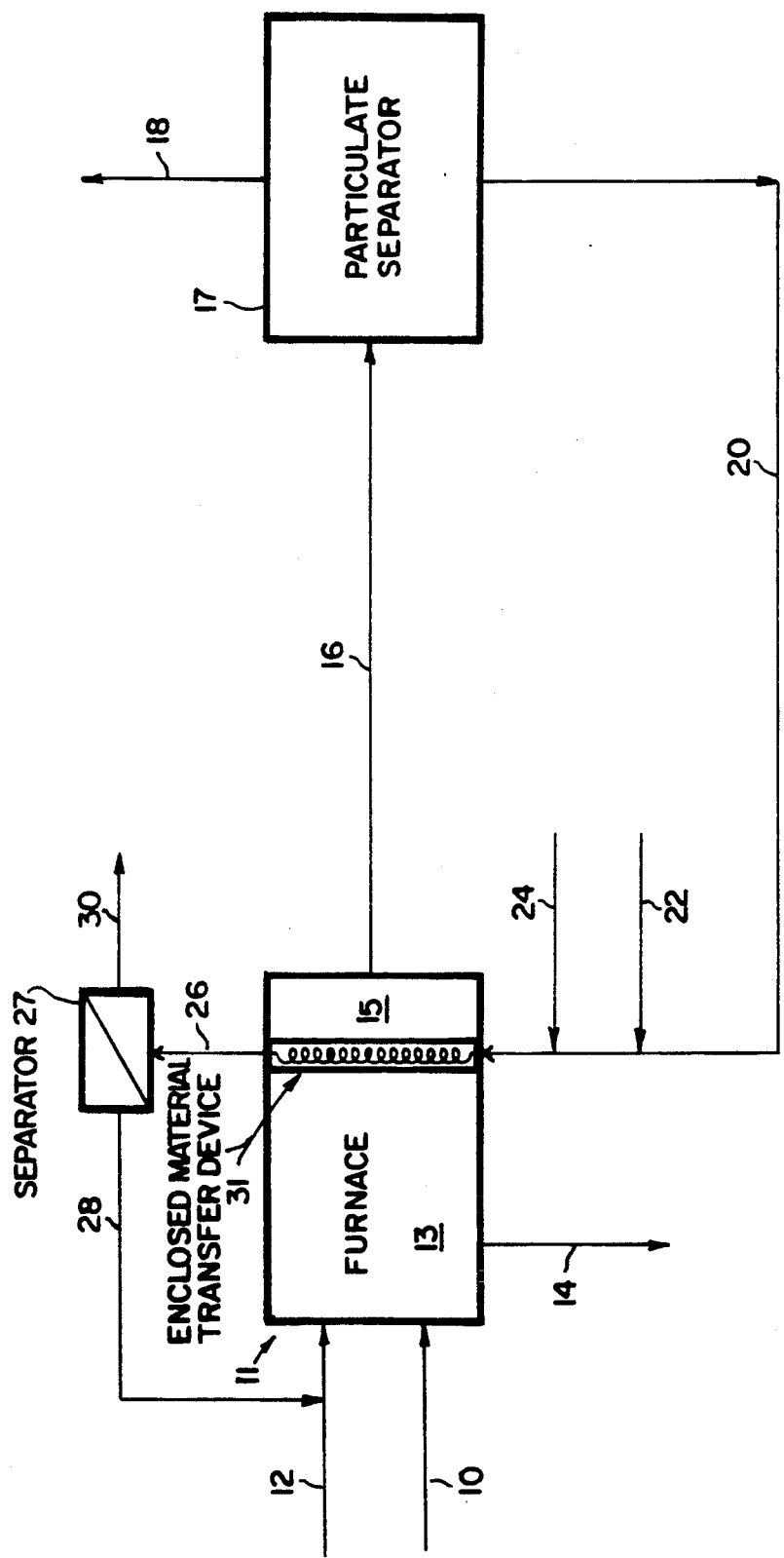
FIG. 1 is a flow diagram of one embodiment of the present invention.

In this specification the term fly ash will be used to describe the finely divided particulate material that can be separated from a gaseous stream in which it is entrained. Illustrative of such particulate materials are those obtained from the off gas of a smelter or the flue gas from various combustion techniques. Thus, for example, the combustion or incineration of a carbon-, heavy metal- and halogen-containing material, such as refuse material, typically municipal solid waste, produces an ash product and an exit gas stream in which are entrained solid particles. Since halogens, and particularly chlorine, in the form of various halogenated or chlorinated polymers are present in the trash being fed to the incinerator, hydrogen halides, particularly hydrogen chloride, are major products from the incineration of these materials. A sizable amount of the hydrogen halides, especially chlorides, that are formed are swept in the gaseous stream from the incineration zone along with various volatile metal halides, particularly chlorides, of lead, cadmium and mercury. It is by this mechanism that a portion of the heavy metals present in the refuse escapes from the incineration section of the incinerator and becomes incorporated into the fly ash product.

This flue gas can then be subjected to treatment for removal of particulate material by several well-known techniques such as by cyclones, filtering, typically using a cloth filter in a "baghouse", or by electrostatic precipitation (ESP).

The active calcium agent required by this invention can be added as a pure component, as a mixture of various active calcium agents, or as a minor component in a mixture of other materials. The active calcium agent can be calcium oxide, calcium hydroxide, or calcium carbonate or mixtures thereof. Broadly, the calcium compound to be added in accordance with this invention can be any thermal precursor of calcium oxide, i.e. a calcium compound that is convertible to calcium oxide at the temperatures employed in the thermal treatment of this invention. The intimate contact of these materials with the heavy metal materials is important so as to promote the reaction of the soluble and volatile heavy metal component with the active agent.

The calcium agents may be pure materials or minor components in a mixture of other materials (active or inactive) and various impurities. Calcium carbonate, for example, can come from various limestones having different levels of hardness, porosity and impurities. Thus, greater or lesser amounts of particular limestones may be required depending upon the concentration of calcium or proportion of calcium to other components in the specific limestone.

Grinding the limestone rock or other calcium-containing material to a size that will provide intimate contact with the heavy metal material will improve the effectiveness of the added agent. Generally, the smaller sizes will promote more intimate contact between the heavy metal compounds and the agent itself.

These agents, when added in an appropriate amount to the ash and subjected to thermal treatment, provide a product of increased stability of heavy metals, particularly lead, wherein the quantity of heavy metals that are leachable under conditions of groundwater exposure will be substantially reduced. The amount of calcium-containing material necessary to effect stabilization is such that the final mixture of fly ash and calcium containing material must have a weight ratio of calcium to fly ash from about 0.04 to about 0.5:1. Generally, it is preferred to maintain a calcium to fly ash ratio of at least about 0.07 gram of calcium per gram of fly ash. Typically, the calcium to fly ash weight ratio will not exceed about 0.4:1.

When engaged in the actual operation of a commercial facility, it may be more convenient to consider the proportion of calcium-containing material to fly ash (as opposed to the proportion of calcium to fly ash per the above paragraph). In such case, the ratio of calcium-containing material to fly ash is typically at least about 0.06 to about 1.25 gram of calcium-containing material per gram of fly ash. Generally, the quantity of calcium-containing material will be at least about 0.2 gram of calcium-containing material per gram of fly ash.

In accordance with this invention the mixture of fly ash and the calcium-containing material is placed within a heated zone in the presence of an oxygen containing gas at a temperature which is greater than about 475° C. but less than a temperature that causes significant vaporization of lead chloride to occur. The latter temperature will be less than the temperature at which lead chloride will boil, namely 950° C., and preferably be at a temperature at which the vapor pressure of lead chloride is quite low. Generally, the temperature employed will be at least about 500° C. Typically, there is no reason to utilize a temperature greater than about 750° C. or 700° C., with temperatures below about 650° C. being quite acceptable.

The time the ash is kept at temperature is important, being at least about 30 minutes up to about five hours. It is, of course, desirable to keep the time period short and thermal treating times of less than about three hours and even less than about one hour are preferred. To those experienced in the art, additional testing and improved control characteristics can result in reduced stabilization times.

The presence of oxygen during the thermal treatment is essential for stabilization to occur. We have found that heating in the absence of sufficient oxygen fails to promote the transformations necessary to bind the heavy metals in such a manner to prevent their dissolution into groundwater. The treatment can be conducted in the presence of an oxygen-containing gas and can be air, air enriched with oxygen, or any gas stream that contains significant oxygen. The use of heated gasses has the additional advantage of providing both the oxygen and the heat required by this process.

The process of this invention can be conducted in a batch or continuous manner.

A common problem that occurs in handling solids of the small size typical of fly ash materials is their propensity to form dust and become airborne within the surrounding air. Often water or dust inhibitors have to be added to keep down the dust that forms when handling these materials, especially in transferring these solids between containers or into vehicles for transport. A unique benefit of the thermal treatment process as disclosed herein is that the average particle size of the thermally treated material increases making the material considerably less dusty.

EXAMPLES

In all of the following Examples, the fly ash samples (whether treated in accordance with this invention or not) were subject to an acid leaching procedure comparable to the toxicity characteristic leaching procedure (TCLP) as defined in 40 CFR 261, Appendix II, which appeared in the Federal Register 55 (61), 11863ff, Mar. 29, 1990. In accordance with the procedure used in the following examples a 50 gram sample of ash material was mixed with 1000 ml of 0.1N acetic acid (2 milliequivalents of acid per gram of ash) and placed into a polyethylene extractor bottle and the screw lid securely fastened. The bottle was placed into a rotary agitation device and rotated at a rate of 30 rpm for 18 hours at ambient temperature. The resultant mixture was filtered through a fiber filter having an effective pore size of 0.6–0.8 micrometers to remove undissolved solids. The concentration of soluble lead in milligrams per liter was determined. If the concentration of soluble lead equals or exceeds 5 mg/l, the ash from which it was obtained is designated by the Environmental Protection Agency (EPA) as a "Hazardous Waste".

In the following Examples 1 through 6, the fly ash material treated was obtained from a municipal waste to energy incinerator processing conventional residential refuse and sewage sludge from a wastewater treatment plant. The incineration plant was equipped with an electrostatic precipitator particulate collection system, but was not equipped with an acid gas scrubber.

EXAMPLE 1

Three samples of the fly ash material described above were each placed in separate porcelain crucibles. Two of the samples were heated in a furnace at different temperatures for four hours. The third sample was not heated. After the heated samples cooled down, each of the samples was subjected to the acid leaching test described above. The lead leaching results for all three samples are shown in Table I.

TABLE I

| Run No. | Treatment Temperature °C. | Time hrs. | Lead Concentration mg/L |
| --- | --- | --- | --- |
| 1 | none | none | 27.1 |
| 2 | 625 | 4 | 20.5 |
| 3 | 550 | 4 | 32.0 |

From the above data it can be seen that thermal treatment in the absence of added calcium additive failed to reduce the leaching of lead sufficiently to pass the EPA standard for lead.

EXAMPLE 2

In this Example samples of the same fly ash used in Example 1 were mixed with various amounts of calcium carbonate. All but one of these mixtures were then subjected to thermal treatment at various temperatures for several different periods of time in the presence of air. The one mixture which was not subjected to the thermal treatment contained the highest level of added calcium carbonate. Each of the mixtures (treated and untreated) was then subjected to the acid leaching test described above. The results are shown in Table II, below.

TABLE II

| Run No. | Additive | Gram Additive per Gram Ash | Gram Calcium per Gram Ash | Treatment Temp °C. | Treatment Time Hrs. | Lead Conc mg/L |
| --- | --- | --- | --- | --- | --- | --- |
| 1 | CaCO$_3$ | 0.05 | 0.02 | 550 | 0.5 | 17.0 |
| 2 | CaCO$_3$ | 0.11 | 0.04 | 550 | 0.5 | 2.2 |
| 3 | CaCO$_3$ | 0.18 | 0.07 | 550 | 0.5 | 1.6 |
| 4 | CaCO$_3$ | 0.33 | 0.13 | 550 | 0.5 | <0.3 |
| 5 | CaCO$_3$ | 0.33 | 0.13 | 475 | 1.0 | 1.7 |
| 6 | CaCO$_3$ | 0.33 | 0.13 | 625 | 4.0 | <0.3 |
| 7 | CaCO$_3$ | 0.33 | 0.13 | none | 0 | 17.3 |

These data indicate that thermal treatment of mixtures including a calcium-containing material in accordance with this invention stabilized the lead and reduced the leachable amount to below the EPA regulatory level of 5 mg/L. It will also be seen that quantities as low as 0.11 gram of calcium-containing material per gram of ash or 0.04 gram of calcium per gram of ash, in combination with the thermal treatment, were effective to provide this stability. Further, it can be seen that thermal treatment times as low as thirty minutes were effective in accordance with this invention. The data also indicate that the addition of a calcium-containing material, even in substantial quantity, is not effective without the thermal treatment of this invention to effect lead stability. The value of 17.3 mg/L shown for Run No. 7 in Table II is an average of three separate repeat experiments.

EXAMPLE 3

To a 75 gram sample of fly ash used in Example 1 was added 25 grams of calcium carbonate. After mixing, the mixture was placed into a porcelain crucible and covered with a lid to keep out air. The crucible was then heated at 475° C. for one hour. The thermally treated material was then subjected to the above described acid leaching test. The leaching solution from this test was found to contain 9.42 mg/L lead. This result, when compared to the result for Run No. 5 in Example 2, which sample was treated in the same manner except in the presence of air, shows the necessity of conducting the thermal treatment of this invention in the presence of an oxygen-containing gas in order to effect heavy metals stabilization.

EXAMPLE 4

To three parts by weight of the fly ash used in Example 1 was added 1 part by weight of calcium oxide and the two solids thoroughly mixed. This mixture, which had a calcium to fly ash weight ratio of 0.23:1, was then separated into two aliquout samples and one such sample was subjected to thermal treatment at 625° C. for a period of 4 hours in the presence of air. This thermally treated material was then subjected to the acid leaching test outlined above and was found to contain a lead concentration in the filtrate of 0.2 mg/L. The other aliquot sample was subjected to the acid leaching test without having been subjected to thermal treatment and was found to contain 25.6 mg/L of lead in the leaching solution. These data illustrate the operability of calcium oxide in this invention and the necessity of thermal treatment in accordance with this invention.

EXAMPLE 5

Three samples of the fly ash used in Example 1 were mixed with two different levels of calcium hydroxide.

Twenty parts by weight of a first sample was admixed with one part by weight of calcium hydroxide, while three parts by weight of the other two samples were each admixed one part by weight of calcium hydroxide. The first admixture and one of the other admixtures were then each subjected to thermal treatment in accordance with this invention. The admixture of the third sample was not subjected to thermal treatment. All three of the admixtures were then subjected to the same acid leaching test. The particular operating conditions employed and the results of the acid leaching test are shown in Table III, below.

TABLE III

| Sample No. | Additive | Gram Additive per Gram Ash | Gram Calcium per Gram Ash | Treatment Temp °C. | Treatment Time Hrs. | Lead Conc mg/L |
|---|---|---|---|---|---|---|
| 1 | Ca(OH)$_2$ | 0.05 | 0.027 | 550 | 0.5 | 10.8 |
| 2 | Ca(OH)$_2$ | 0.33 | 0.18 | 625 | 4.0 | <0.08 |
| 3 | Ca(OH)$_2$ | 0.33 | 0.18 | none | none | 21.5 |

From the above data it can be seen that calcium hydroxide is operable in the process of this invention and that thermal treatment is also necessary. It can be further seen that the addition of calcium hydroxide at a level of only 0.05 g/g of ash is not sufficient in accordance with this invention.

EXAMPLE 6

To three parts by weight of a sample of the fly ash used in Example 1 was added 1 part by weight of silicon dioxide and the two solids thoroughly mixed. This mixture was then subjected to thermal treatment at 550° C. for a period of 4 hours in the presence of air after which the thermally treated material was subjected to the acid leaching test and found to contain lead concentration in the filtrate of 14.8 mg/L, i.e. above the EPA limit of 5 mg/L. The results of this example demonstrate that the addition of a non calcium-containing material was not effective to stabilize heavy metals as is the process of this invention.

One particular embodiment of the present invention is to use the furnace of a MSW incineration plant as the source of heat required by the present invention and to use ambient air as the oxygen-containing gas required by the invention. FIG. 1 illustrates this embodiment. Referring now to FIG. 1, a MSW feed stream containing carbon-, heavy metal-, and halogen-containing materials (stream 10) and an ambient air stream (stream 12) are fed to a furnace 11 having a combustion zone 13 and a heat recovery zone 15, a portion of which heat recovery zone 15 is at a temperature from about 475° C. to about 800° C. In the furnace's combustion zone 13, the MSW feed stream is burned to produce combustion products in the solid state and combustion products in the gaseous state. A portion of the solid state combustion products becomes entrained in the gaseous state combustion products and this mixture is removed from the furnace 11 as a flue gas in stream 16. The remaining portion of the solid state combustion products that does not become entrained in the gaseous state combustion products is removed from the furnace 11 as a bottom ash product in stream 14. The flue gas is then fed to a particulate separator 17 where the flue gas is separated into the gaseous state combustion products and the portion of the solid state combustion products formerly entrained therein. The gaseous state combustion products are vented as a stack gas in stream 18 while the formerly entrained solid state combustion products are removed as a heavy metals-containing fly ash in stream 20. The fly ash of stream 20 is then mixed with a calcium-containing compound (stream 22) and ambient air (stream 24) prior to being placed in the portion of the furnace's heat recovery zone 15 which is at a temperature from about 475° C. to about 800° C. for a period of time from about 30 minutes to about five hours. The mixture of treated fly ash and air is then removed from the furnace 11 in stream 26 and fed to a separator 27 to separate the air from the treated fly ash. The separated air is recycled back to the furnace 11 in stream 28 while the treated fly ash exits the separator 27 in stream 30. As shown in FIG. 1, the mixture comprising the fly ash enters and exits the furnace 11 by means of an enclosed material transfer device 31. An example of such a device would be a screw conveyor.

Figure 2:
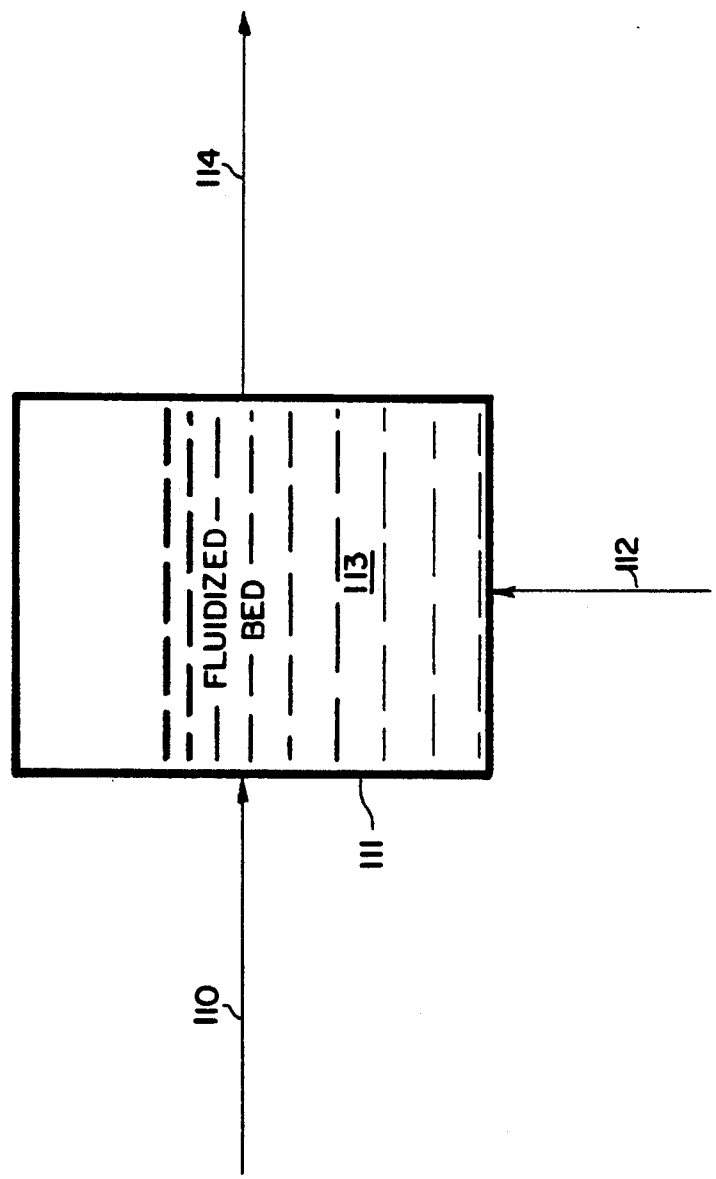
FIG. 2 is a flow diagram of a second embodiment of the present invention.

A second embodiment of the present invention is to heat ambient air as the oxygen-containing gas to a temperature from about 475° C. to about 800° C. followed by contacting the mixture of the fly ash and the calcium-containing material with the heated air for a period of time from about 30 minutes to about five hours wherein said contacting is performed while the mixture is contained within a fluidized bed. FIG. 2 illustrates this embodiment. Referring now to FIG. 2, a first feed stream 110 comprising the mixture of the fly ash and the calcium-containing material is introduced into fluidized bed reactor 111. A second feed stream 112 comprising air which has been heated to a temperature from about 475° C. to about 800° C. is also introduced into the fluidized bed reactor 111 in a manner to form a fluidized bed 113 of the fly ash and calcium-containing material within the fluidized bed reactor 111 thereby providing direct and intimate contact between the fly ash and calcium-containing material of stream 110 and the heated air of stream 112 for a period of time from about 30 minutes to about five hours. The effluent from the fluidized bed (represented by stream 114 in FIG. 2) will comprise the treated fly ash product and the heated air. The heated air can be separated from the solids in stream 114 by means well known in the art (e.g. cyclone saparators) and recycled to the air feed stream 112 to recover its heat content. A portion of the fly ash in the effluent from the fluidized bed reactor 111 may become entrained within the heated air during the contact time between the two feed streams and thus require separation in a particulate separator. After separation, this portion may be recycled to the fly ash feed stream 110 or withdrawn as treated fly ash product, depending whether the contact time for the entrained fly ash was sufficient.

We claim:

1. A process for the stabilization of heavy metals-containing fly ash obtained by subjecting flue gas to particulate separation, which process comprises forming a mixture of the fly ash and a calcium-containing material, said calcium-containing material being present in the mixture so as to provide a weight ratio of calcium to fly ash from about 0.04 to about 0.5:1, heating the mixture to a temperature from about 475° C. to about 650° C. and maintaining said temperature for a period of time from about 30 minutes to about five hours while in the presence of an oxygen-containing gas.

2. The process of claim 1 wherein the calcium containing material is calcium oxide or a thermal precursor of calcium oxide.

3. The process of claim 1 wherein the mixture of fly ash and calcium-containing material is formed by adding the calcium-containing material to the fly ash obtained by particulate separation so as to incorporate the required amount of calcium into the separated fly ash.

4. The process of claim 1 wherein the calcium-containing material is selected from the group consisting of calcium carbonate, calcium hydroxide and calcium oxide.

5. The process of claim 1 wherein the mixture is heated to a temperature above about 500° C.

6. The process of claim 1 wherein the period of time is less than about three hours.

7. The process of claim 1 wherein the period of time is less than about one hour.

8. The process of claim 1 wherein the proportion of calcium-containing material in the mixture with the fly ash is from about 0.06 to about 1.25 gram of calcium-containing material per gram of fly ash.

9. The process of claim 8 wherein the calcium-containing material is present in the mixture in a proportion greater than about 0.2 gram of calcium-containing material per gram of fly ash.

10. The process of claim 1 wherein the proportion of calcium-containing material in the mixture with the fly ash is such as to provide a ratio of calcium to fly ash greater than about 0.07 gram of calcium per gram of fly ash.

11. The process of claim 1 wherein the calcium-containing material is present in the mixture in an amount so as to provide a ratio from about 0.07 to about 0.4 gram of calcium per gram of fly ash, the temperature is from about 500° C. to about 650° C. and the time is from about 30 minutes to about one hour.

12. The process of claim 1 wherein said flue gas is obtained by combusting carbon-, heavy metal-, and halogen-containing materials in a furnace having a combustion zone and a heat recovery zone, a portion of which heat recovery zone is at a temperature from about 475° C. to about 650° C.

13. The process of claim 12 wherein the portion of the process comprising heating the mixture at a temperature from about 475° C. to about 650° C. and maintaining said temperature for a period of time from about 30 minutes to about five hours while in the presence of an oxygen-containing gas comprises:
    (a) adding the oxygen-containing gas to the mixture to form a subsequent mixture;
    (b) placing the subsequent mixture in the portion of the furnace's heat recovery zone which is at a temperature from about 475° C. to about 650° C. for a period of time from about 30 minutes to about five hours;
    (c) removing the subsequent mixture from the furnace.

14. The process of claim 13 wherein ambient air is used as the oxygen-containing gas.

15. The process of claim 14 wherein steps (b) and (c) are performed while the subsequent mixture is contained within an enclosed material transfer device.

16. The process of claim 1 wherein the portion of the process comprising heating the mixture to a temperature from about 475° C. to about 650° C. and maintaining said temperature for a period of time from about 30 minutes to about five hours while in the presence of an oxygen-containing gas comprises:
    (a) heating the oxygen-containing gas to a temperature from about 475° C. to about 650° C.;
    (b) contacting the mixture with the heated oxygen-containing gas from step (a) for a period of time from about 30 minutes to about five hours.

17. The process of claim 16 wherein ambient air is used as the oxygen-containing gas.

18. The process of claim 17 wherein step (b) is performed while the mixture is contained within a fluidized bed.

* * * * *